Sept. 21, 1948.                    C. N. WARD                    2,449,963
              METHOD AND MEANS FOR PROTECTING SHORE AND OTHER
                      STRUCTURES AGAINST DAMAGE BY ICE
Filed Oct. 24, 1946                                    2 Sheets-Sheet 1
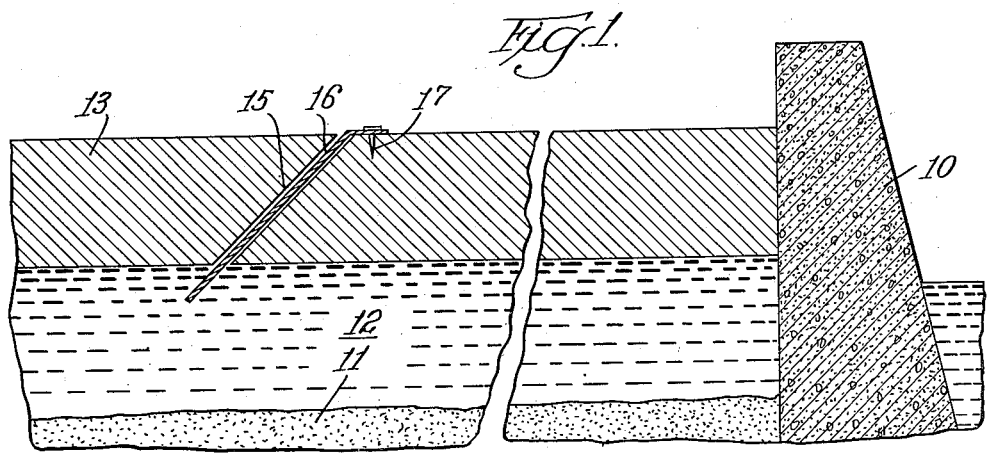
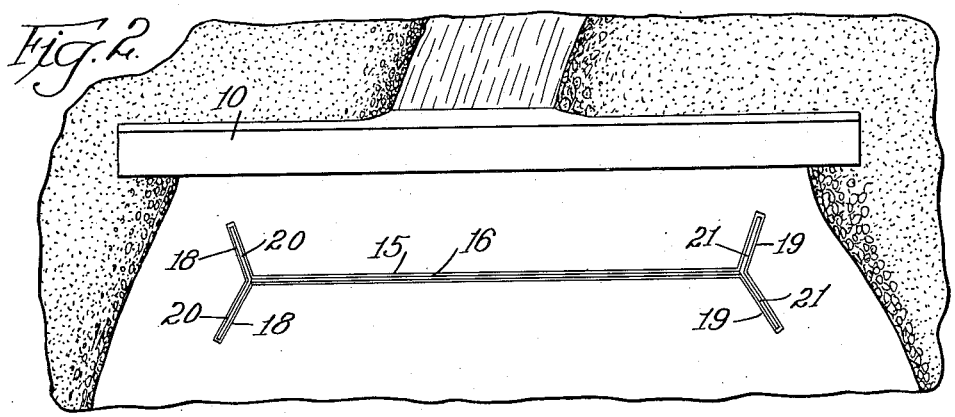
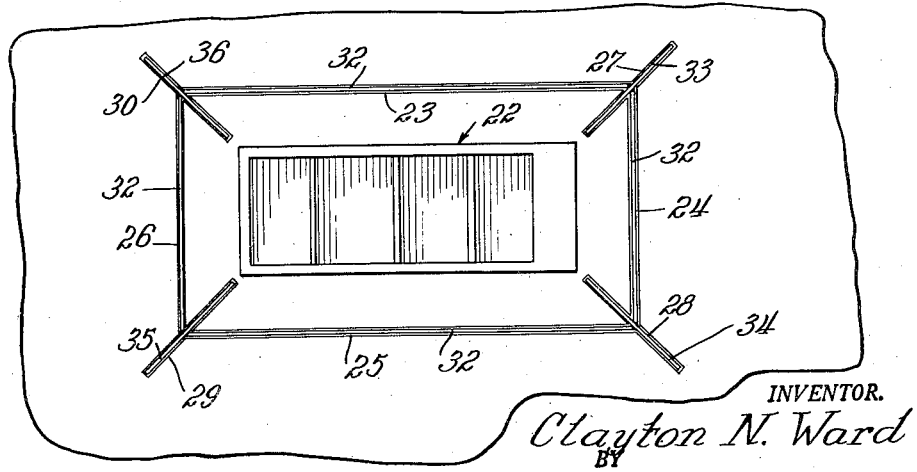
INVENTOR.
Clayton N. Ward
BY
Jesch and Darbo
Attys.

Sept. 21, 1948.  C. N. WARD  2,449,963
METHOD AND MEANS FOR PROTECTING SHORE AND OTHER
STRUCTURES AGAINST DAMAGE BY ICE
Filed Oct. 24, 1946  2 Sheets-Sheet 2
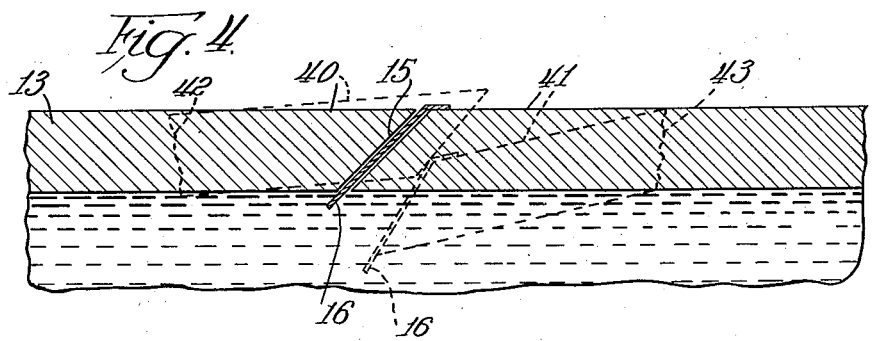
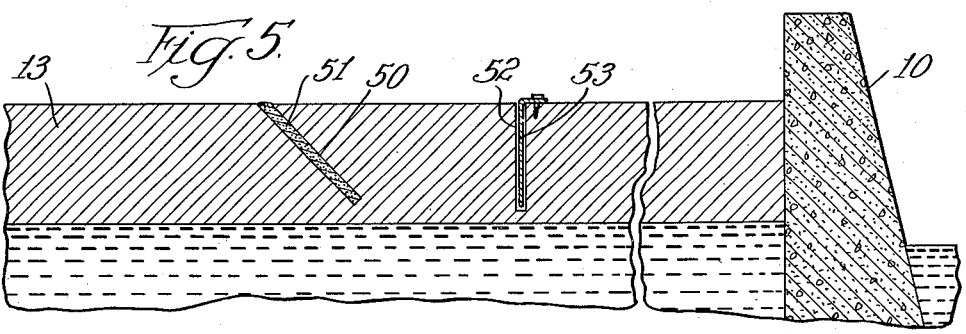
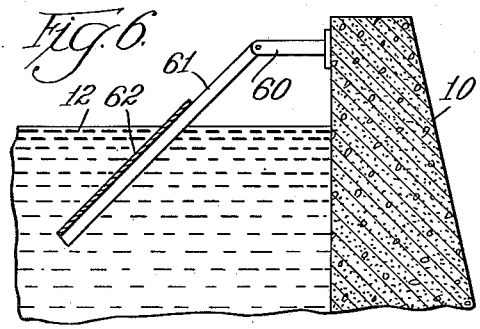
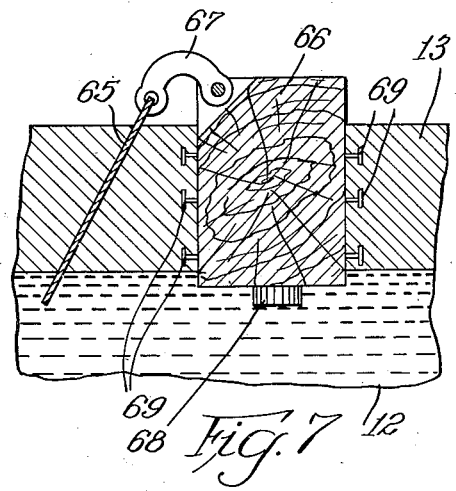
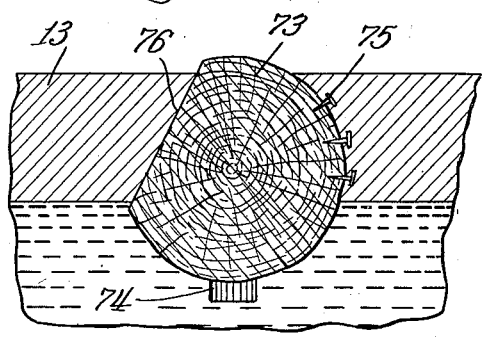
INVENTOR.
Clayton N. Ward
BY
Jesch and Darbo
Attys.

Patented Sept. 21, 1948

2,449,963

UNITED STATES PATENT OFFICE 2,449,963

METHOD AND MEANS FOR PROTECTING SHORE AND OTHER STRUCTURES AGAINST DAMAGE BY ICE

Clayton N. Ward, Madison, Wis.

Application October 24, 1946, Serial No. 705,401

17 Claims. (Cl. 61—1)

This invention relates to methods and means for protecting shore and other structures against damage by ice. Such structures may be the shore itself or structures located upon the shore or in the water of bodies of water, such as ponds, lakes, rivers and other streams, which structures are in contact with the surface portion of the water. In particular, it relates to improved methods and means for reducing the thrust against such structures created by the expansion of the ice which takes place during a rise in temperature.

In a lake, pond, river, or other body of water which is subject to freezing, severe damage to the shore, or structures upon the shore or built in the water, or floating upon the water, frequently results from the expansion of the ice sheet covering the water during the freezing season. Such expansion occurs because of an increase in the temperature of the ice which may be caused by rising air temperature or by heat absorbed directly from the sun, or by both of these causes. In addition to the shore itself, the structures which may be damaged are dams, wharves, docks, piers, water supply intakes, boats, barges, or any structure which is in contact with the surface portion of the water which becomes frozen during the cold season.

It is the object of the invention to provide methods and means for protecting such structures against damage caused by the thrust due to the expansion of the ice.

Specifically, it is the object of the invention to provide an artificial section of weakness in the covering sheet of ice adjacent to the structure to be protected, the section of weakness being so arranged that the horizontal thrust of the ice against the structure, which occurs when the ice undergoes expansion, is reduced to a value such that the structure is not damaged.

It is a further object of the invention to provide an artificial section of weakness within a covering sheet of ice whereby horizontal thrust which may exist in said ice sheet due to expansion thereof is not transmitted effectively across the section of weakness.

Other objects and advantages will become apparent as the following description progresses, which is to be taken in conjunction with the accompanying drawings in which:

Fig. 1 is a sectional elevational view illustrating one form of the protecting means of the invention;

Fig. 2 is a plan view showing the arrangement of the protecting means with respect to the structure when one side of the structure is in contact with the water;

Fig. 3 is a plan view showing the arrangement of the protecting means when the structure to be protected is surrounded by water;

Fig. 4 is a sectional elevational view illustrating the action which occurs at the section of weakness when expansion of the ice takes place; and Figs. 5 to 8 inclusive are sectional elevational views illustrating different modifications of the protecting means of the invention.

In Fig. 1, the structure to be protected is the dam 10 which is supported in stationary fashion upon the surface of the ground 11 and acts as a retaining wall for the body of water 12 upon one side thereof. During the freezing season, the body of water has a sheet of ice 13 upon the surface thereof. After the ice sheet 13 has been formed, and the temperature of the ice rises due to a rise in temperature of the atmosphere or the absorption of heat from the sun, the ice sheet undergoes expansion and elongation in the horizontal direction. As a result, a horizontal thrust is exerted against the dam 10 and compressive forces are created within the ice, these forces being of great magnitude. In accordance with the present invention, this thrust is relieved or reduced to the point where it causes no damage to the dam 10 by cutting a slot 15 in the ice at a suitable distance from the dam 10, the slot extending lengthwise in a direction generally parallel to the front of the dam 10 and extending crosswise in an inclined direction through the ice. The slot 15 may be cut by a sawing operation or any other suitable operation, and is preferably of substantial width, and into the slot is placed a sheet- or strip-form separating member or membrane 16 which extends through the ice sheet from the top surface to the bottom surface thereof. The member 16 may be composed of any suitable material, such as metal, wood, plywood, cardboard, heavy paper such as sisal-kraft, hard board composed of pressed wood fibers, synthetic resin, such as phenol formaldehyde resin, or the like. It is desired that the member 16 be attached to the surface of the ice sheet 13 on one side of the slot 15 so that the member does not become displaced, especially if the slot 15 opens more widely due to contraction of the ice. For this purpose, attaching means, such as the spikes 17, may be employed.

It is desirable that the surface of the ice upon the side of the slot opposite to that to which the strip member 16 is attached exhibit toward said strip member a relatively low coefficient of friction, which is substantially less than the coefficient of internal friction of the ice. By "friction" is meant starting friction, in the presence or absence of attachment or adherence between the separating member 16 and the ice, and rolling friction. If the natural coefficient of friction is excessively great, the surface of the member 16 may be treated with a substance having a lubricating effect, such as paint, wax, grease, or the like.

The slot 15 may be inclined in either direction, that is, in addition to being inclined in the direction shown in Fig. 1, it may be inclined in the opposite direction. The angle of inclination is not critical. The effectiveness in reducing the thrust increases as the incline becomes more gradual, but at the same time the convenience and economy decreases, and an angle of inclination may be chosen which combines satisfactory reduction of thrust with convenience and economy. An angle of from 20° to 70° with respect to the horizontal is preferred.

The arrangement of the slot with respect to the dam 10 is shown in Fig. 2. The ice 13 is upon the surface of the pond above the dam 10, and the slot 15 is spaced in front of the dam a suitable distance which is not critical and may be varied, depending upon the thickness of the ice sheet. It may be as near to the dam as the cutting equipment permits and it is effective at a distance of 200 feet. In practice, it is spaced in the neighborhood of 10 feet away. The slot 15 extends lengthwise in a direction substantially parallel to the front of the dam 10, although it is not essential that such parallel arrangement be maintained, it being sufficient that the broad surface of the slot is in front of the proper portion of the dam. That is, if it is desired to provide substantially the same protecting influence as is provided by slot 15 the slot may be placed at an angle to slot 15 but it should be sufficiently longer that a projection thereof drawn perpendicular to the dam 10 will substantially coincide with the slot 15. In general, the slot 15 and separating member 16 are arranged broadside, or in the relation of a protecting apron, with respect to the dam 10. At the ends of the slot 15 are provided auxiliary slots 18 and 19 which intersect with the slot 15 and extend substantially vertically through the ice sheet and horizontally in both directions from the slot 15 in a gradually diverging relationship. Sheet members 20 and 21 are arranged in slots 18 and 19 respectively in the same manner as sheet member 16 is arranged in slot 15. The diverging relationship of slots 18 and 19 and the direction in which they extend from slot 15 are not critical, and they may be arranged perpendicular to slot 15, or in a converging relationship, and may extend in only one direction from slot 15, which may be either toward or away from the dam 10. Also, the length of the slots 18 and 19 is not critical. These factors will become clear as an explanation of the action is given hereinafter.

In Fig. 3, an arrangement of the slots is shown for a condition in which the structure to be protected is surrounded by ice. The object to be protected is indicated as the barge 22, but it may be any other object, such as a diving structure, water intake, etc. Inclined primary slots 23, 24, 25 and 26, which may be similar to the slot 15, are provided in front of the different sides, respectively, of the barge 22 and spaced a suitable distance therefrom. Said slots are extended lengthwise so as to connect or intersect with one another, and at the four junctions, auxiliary slots 27, 28, 29 and 30 are provided extending from said junctions toward and away from the barge 22 in generally diagonal directions. The slots 27, 28, 29 and 30 are arranged to extend substantially vertically through the ice sheet 13. Sheet members 32 are provided in the primary slots 23, 24, 25 and 26 and sheet members 33, 34, 35 and 36 are provided in the auxiliary slots, said sheet members being similar to the sheet member 16, which has been described heretofore.

The slots are cut at a time when the ice has frozen to a sufficient depth to enable it to support the necessary men and equipment, and if the ice has not already frozen to its expected manimium thickness, the separating member 16 is caused to extend downwardly into the water beneath the ice to the lowest level to which it is expected the ice will freeze.

When the ice sheet expands because of a rise in the temperature thereof, horizontal forces of compression of a high value are created therein. The coefficient of friction between a surface of the separating member 16 and the adjacent surface of the ice being substantially less than the coefficient of internal friction of the ice itself, the edge portion of the ice sheet on one side of the slot tends to slide upwardly upon the surface of the member 16, and the edge portion upon the other side of the slot tends to move downwardly. The relative positions of the two portions of the ice sheet before the compressive forces are set up are shown in solid lines in Fig. 4, the said portions being designated respectively by the numerals 40 and 41. As stated heretofore, the separating member 16 exhibits toward the ice a low coefficient of friction, which is substantially less than the coefficient of internal friction of the ice. Before the compressive forces occur, the two edge portions remain at their natural level, but as soon as the forces begin to exert their influence, the portion 40 slides upwarly upon the inclined surface of the separating member 16. The edge portion 41 simultaneously slides downwardly, and this action continues as further expansion occurs. The action is facilitated by the auxiliary slots 19 and 20 and the separating members within said slots. As a result, an upward bending moment is exerted upon edge portion 40 and a downward bending moment upon edge portion 41, these moments becoming greater as the expansion continues until one or both of said edge portions break away from the main section of the ice 13 and fractures 42 and 43 are formed at lines spaced away from the slot 15. This action greatly reduces and relieves the thrust exerted against the dam 10 and prevents the damage which may otherwise be caused by such thrust. The combination of the slot 15 and the separating member 16 constitutes a section of weakness in the ice at which it separates under the forces of compression to relieve the thrust against the structure to be protected.

In the modification shown in Fig. 5, an inclined slot 50 of substantial width is cut into the ice sheet 13, said slot extending from the upper surface of the sheet 13 a major portion but not all of the distance to the lower surface of the ice sheet. A separating member similar to the member 16 of Fig. 1, may be placed in the slot 50, or the slot may be filled with a material 51 having little tensile strength which may be in the form of a sheet or of loose particles, such as sand, paraffin, asphalt, a mixture of sand and asphalt, or any other substance which exhibits a low coefficient of friction toward ice and thereby reduces the ability of the ice sheet to transmit thrust across the slot.

A second slot 52 is cut into the ice from the upper surface thereof downwardly to a point adjacent to but not reaching the lower surface of the ice and extending lengthwise in the same general direction as slot 50. The lower end of slot 52 is intentionally caused to be at a lower level than the lower end of slot 50, so that if a contraction of the ice takes place due to a drop in the temperature thereof, the ice sheet 13 will separate at the section thereof beneath slot 52 rather than at the section thereof beneath slot 50. A separating member 53, which may be similar to the separating member 16 of Fig. 1, is arranged in slot 52 and suitably attached to the surface of the ice at one side of the slot. While the slot 52 is shown as being arranged toward the dam 10 from the slot 51, it may be arranged on the opposite side of the slot 51 as well. Slot 50 is the primary slot and auxiliary slots and separating members may be provided in connection with slot 50, as described heretofore.

The arrangement of Fig. 5 makes it possible to employ a loose material or a sheet material having little or no tensile strength, such as a sheet of paraffin, in the inclined slot. The arrangement also demonstrates that it is not necessary for the inclined separating member to extend all the way through the ice. While the arrangement results in somewhat more thrust being exerted against the structure to be protected, the uncut section of ice beneath the slot 50 can be arranged to be relatively thin and, under the influence of the compressive forces present during expansion of the ice sheet, this uncut section is readily sheared, and the protecting action is generally similar to that described heretofore. The auxiliary slots and separating members may also extend somewhat less than all of the way through the ice sheet, if desired. It is preferred that both the primary and auxiliary slots extend through the major portion of the thickness of the ice sheet, in order that the benefits of the invention be realized.

In the method and means which have been described heretofore, the slots are cut in the frozen sheet of ice. In the construction shown in Fig. 6, the means are arranged in the water before the ice is frozen. The dam 10 has a number of arms 60 attached thereto and extending outwardly therefrom above the water on the upstream side of the dam. Arms 61 are attached to arms 60, preferably in a pivotal fashion, and extend downwardly at an incline into the water. A sheet-form separating member 62, which may be similar to the separating member 16 of Fig. 1, is attached to the arms 61 and extends downwardly at an incline from a point above the surface of the water 12 to a level substantially as low as the lowest level to which it is expected the ice will freeze. The structure is made sufficiently strong and rigid to withstand the action of wind and waves as long as the water 12 remains unfrozen, but the arms 61 are preferably so constructed that they will fracture after the ice sheet is formed and forces of compression or tension are exerted upon the separating member 62 by the ice sheet. In the presence of forces of tension, the arms 61 serve to lock the separating sheet 62 to the surface of the section of the ice toward the dam, and the section of the ice on the opposite side of the member 62 separates from the said member. In the presence of the forces of compression, the protecting action is similar to that which has been described heretofore. A suitable material for the arms 61 is wood, sheet metal, hard board composed of pressed wood fiber, or the like. The member 62 is the primary separating member and auxiliary separating members may be provided as described heretofore.

In Fig. 7, a separating member 65, which may be similar to the member 16 described heretofore, is supported upon a floating boom member 66, which may be composed of wood and in the shape of an elongated bar or beam and arranged in the water 12 before the ice is frozen in such manner that the separating member 65 is in the proper relation to the structure to be protected, as described heretofore. The separating member 65 may be suitably supported upon boom member 66 by means of the arms 67. The boom member may have one or more weights 68 suitably attached to its bottom surface to maintain the boom member 66 in the proper orientation while it floats in the water. The sides of the boom member 66 may be roughened or have pins, spikes, or other form of projecting members 69 extending therefrom. After the ice sheet 13 has formed, the boom member 66 is locked in position by means of its roughened surfaces or the projecting members 69 and is firmly attached to the section of the ice 13 on one side of the separating member 65. Upon the occurrence of expansion in the ice sheet 13, the action is similar to that which has been described heretofore. The boom member 66 is preferably of sufficient size to extend vertically beyond the top and bottom surfaces of the ice sheet 13, although this is not essential and it is sufficient if the boom member possesses sufficient buoyancy and stability to maintain the separating member 65 in the proper position.

In Fig. 8, the separating member itself is in the form of a log or boom member 73 which is floated in the water before the ice freezes. The boom member 73 is arranged in the proper position in the water with respect to the structure to be protected, as described heretofore. It is provided with one or more weight members 74, suitably attached to the bottom thereof, and is roughened or provided with projecting members 75 upon one side which will be in contact with the ice sheet 13 after the latter is formed by freezing. Upon the side opposite from the projecting members 75, the boom member is shaped to present a substantially flat inclined surface 76 to the ice sheet 13. It is preferred that the inclined surface 76 extend downwardly from a level above the top surface of the water to the lowest level to which it is expected the water will freeze, so that after the ice sheet 13 is formed by freezing the surface 76 will extend through the ice sheet from the top to the bottom surface thereof. If desired, the surface 76 may be treated to reduce the coefficient of friction between it and the adjacent surface of the ice sheet 13, as by painting said surface 76 or treating it with wax, grease or other suitable lubricating or anti-friction material.

In the presence of a shrinkage or contraction of the ice sheet 13, the side of the boom member 73 having the projecting members 75 remains attached to the ice and separation takes place at the surface 76. In the presence of an expansion of the ice sheet, a separation between the ice and the boom member 73 takes place at the surface 76 while the opposite side of the boom member remains attached to the ice sheet, and a sliding action occurs similar to that which has been described heretofore in which the ice slides upwardly upon the surface 16, whereby the thrust against the structure to be protected is reduced or relieved. The primary separating members are shown in Figs. 7 and 8, and auxiliary separating members of similar construction may be provided having vertical instead of inclined separating surfaces.

While a number of modifications of the invention have been described and illustrated, this is not exhaustive of the forms which the invention may take and other changes and alterations may be made within the scope of the invention as the same is set forth in the appended claims. For example, while the primary slot has been shown as being inclined, it may in some instances extend vertically. Where the primary purpose is to prevent the transmission of a tensile force when the ice contracts, a vertical arrangement of slot and separating member may be used. Also, if the ice is of non-uniform thickness, or if the temperature varies from the top to the bottom of the ice sheet, an eccentric compressive thrust is developed across a vertical slot, and substantial reduction of thrust is obtained by a vertically arranged combination of slot and separating member.

In some instances the auxiliary slots may be omitted. This is especially true where there are thin spots in the ice or where the primary slot is long. In the latter case the ice sheet bends and undergoes fracture. Such fractures usually occur adjacent to the middle of the slot and sometimes adjacent to the ends of the slot as well. Also, while the separating member has in all cases been shown as being substantially planar so as to present a substantially flat surface to the contacting surface of the ice, it does not need to be such, but may be curved or angular. For example, it may be corrugated or reticulated in a lengthwise or crosswise direction, or in both directions. In the modification of Fig. 8, the separating surface 76 may be of other than flat inclined shape. It may be the natural cylindrical surface of the log. In the latter case, the bark of the log should be removed from the portion thereof which is intended to slide in contact with the ice sheet 13, and said surface may be treated as by painting, waxing, etc., so as to reduce the coefficient of friction between it and the ice. In such case, the log is preferably of large enough diameter and weighted sufficiently that it floats low in the water, as shown in Fig. 8, so that the compressive forces have a substantial component in the inclined direction whereby there is a tendency for the ice to slide upwardly upon the log surface. Also, in the modification of Fig. 8, a separating member, similar to the member 16 of Fig. 1, may be arranged upon the surface 76 of the boom member 73, and attached thereto.

What is claimed is:

1. The method of protecting a structure in contact with the surface portion of a body of water against damage by expansion of a sheet of ice upon said water, which comprises creating a slot in said ice sheet extending across in front of the portion of said structure to be protected and downwardly in an inclined direction, and placing in said slot a substance exhibiting toward said ice a coefficient of friction substantially less than the coefficient of internal friction of said ice.

2. The method of protecting a structure in contact with the surface portion of a body of water against damage by expansion of a sheet of ice upon said water, which comprises supporting in said surface portion of said water a body having a broad non-porous, water repellent surface, and arranging said body with said broad surface thereof extending across in front of the portion of the structure to be protected and downwardly in an inclined direction.

3. The method of protecting a structure in contact with the surface portion of a body of water against damage by expansion of a sheet of ice upon said water, which comprises supporting in said surface portion of said water a sheet-form body having a broad flat non-porous, water repellent surface, and arranging said body with said broad surface thereof extending across in front of the portion of said structure to be protected and downwardly in an inclined direction from substantially the surface of the water the major portion of the distance to the lowest level to which it is expected the water will freeze.

4. Means for protecting a structure in contact with the surface portion of a body of water against damage by expansion of an ice sheet upon said water, comprising a separating member in said ice sheet in front of said structure, said separating member having a broad surface arranged generally broadside with respect to said structure and extending in an inclined direction through at least a major portion of the thickness of said ice sheet, said broad surface exhibiting toward the ice a coefficient of friction substantially less than the coefficient of internal friction of said ice.

5. A protecting means as claimed in claim 4, in which the separating member is in the general form of a sheet.

6. A protecting means as claimed in claim 4, in which the separating member does not adhere to the ice upon at least one side thereof.

7. A protecting means as claimed in claim 4, in which the separating member is attached to the ice upon one side thereof.

8. As a means for protecting a structure in contact with the surface portion of a body of water against damage by expansion of an ice sheet upon said water, said ice sheet having a slot therein extending across in front of the portion of said structure to be protected and downwardly in an inclined direction through at least a major portion of the thickness of said ice sheet, and a substance in said slot exhibiting toward said ice a coefficient of friction substantially less than the coefficient of internal friction of said ice.

9. Means for protecting a structure in contact with the surface portion of a body of water against damage by expansion of an ice sheet upon said water, comprising a separating member in said ice sheet and adjacent to said structure, said separating member having a broad surface arranged generally broadside with respect to said structure and extending in an inclined direction through at least a major portion of the thickness of said ice sheet, and at least two spaced apart additional separating members in said ice and extending from the same side of said first separating member in a horizontal direction at an angle to the horizontal direction of said first separating member, said additional separating members each having a broad surface extending substantially vertically through at least a major portion of the thickness of said ice sheet, said broad surfaces exhibiting toward said ice a coefficient of friction substantially less than the coefficient of internal friction of said ice.

10. Means for reducing horizontal thrust caused by the expansion of a sheet of ice upon a body of water, comprising a separating member in said ice sheet having a broad surface extending in an inclined direction through at least a major portion of the thickness of said ice sheet, and at least two additional spaced apart separating members in said ice and extending from the same side of said first separating member in a horizontal direction at an angle to the horizontal direction of said first separating member, said additional separating members each having a broad surface extending substantially vertically through at least a major portion of the thickness of said ice sheet, said broad surfaces exhibiting toward said ice a coefficient of friction substantially less than the coefficient of internal friction of said ice.

11. As a means for protecting a structure in contact with the surface portion of a body of water against damage by expansion of an ice sheet upon said water, said ice sheet having a slot therein adjacent to said structure and extending in an inclined direction partially through said ice sheet, said slot being arranged generally broadside with respect to said structure and being occupied by a solid substance exhibiting toward said ice a coefficient of friction substantially less than the coefficient of internal friction of said ice, said ice sheet having a second slot therein generally parallel to and spaced from said first slot, and a separating member in said second slot, said separating member extending through a greater portion of the thickness of said ice sheet than does said first slot.

12. Means for reducing horizontal thrust caused by the expansion of a sheet of ice upon a body of water, comprising a separating member in said ice sheet having a broad surface extending downwardly through at least a major portion of the thickness of said ice sheet, and at least two additional spaced apart separating members in said ice and extending from the same side of said first separating member in a horizontal direction at an angle to the horizontal direction of said first separating member, said additional separating members each having a broad surface extending downwardly through at least a major portion of the thickness of said ice sheet, said broad surfaces exhibiting toward said ice a coefficient of friction substantially less than the coefficient of internal friction of said ice.

13. A protecting means as claimed in claim 4, in which the broad surface of the separating member is substantially planar.

14. Means for protecting a structure exposed to the surface portion of a body of water against damage by ice, comprising a solid body having a broad surface extending across in front of the portion of said structure to be protected and downwardly in an inclined direction from the surface of said water at least a major portion of the distance to the lowest level to which the water is expected to freeze, said broad surface being non-porous and water repellent.

15. Means for protecting a structure in contact with the surface portion of a wide-extending body of water, such as a lake, river, etc., against damage by expansion of an ice sheet upon said water, which comprises a separating member in front of said structure, said separating member having a broad surface arranged generally broadside with respect to said structure and having its lengthwise dimension extending horizontally and its widthwise dimension extending downwardly in an inclined direction through at least a major portion of the thickness of said ice sheet, said broad surface exhibiting toward said ice a coefficient of friction substantially less than the coefficient of internal friction of said ice.

16. A protecting means as claimed in claim 15, in which a broad surface of the separating member has been treated to reduce its adhesion to the ice.

17. A protecting means as claimed in claim 15, in which a broad surface of the separating member is non-porous and water repellent.

CLAYTON N. WARD.

Certificate of Correction

Patent No. 2,449,963.

September 21, 1948.

CLAYTON N. WARD

It is hereby certified that error appears in the printed specification of the above numbered patent requiring correction as follows:

Column 4, line 16, for "manimium" read *maximum*;

and that the said Letters Patent should be read with this correction therein that the same may conform to the record of the case in the Patent Office.

Signed and sealed this 11th day of January, A. D. 1949.

[SEAL]

THOMAS F. MURPHY,
*Assistant Commissioner of Patents.*